March 31, 1953 — H. N. BANEY ET AL — 2,633,039
SHAFT CUTTING AND CENTERING MACHINE
Filed Dec. 26, 1946 — 3 Sheets-Sheet 1
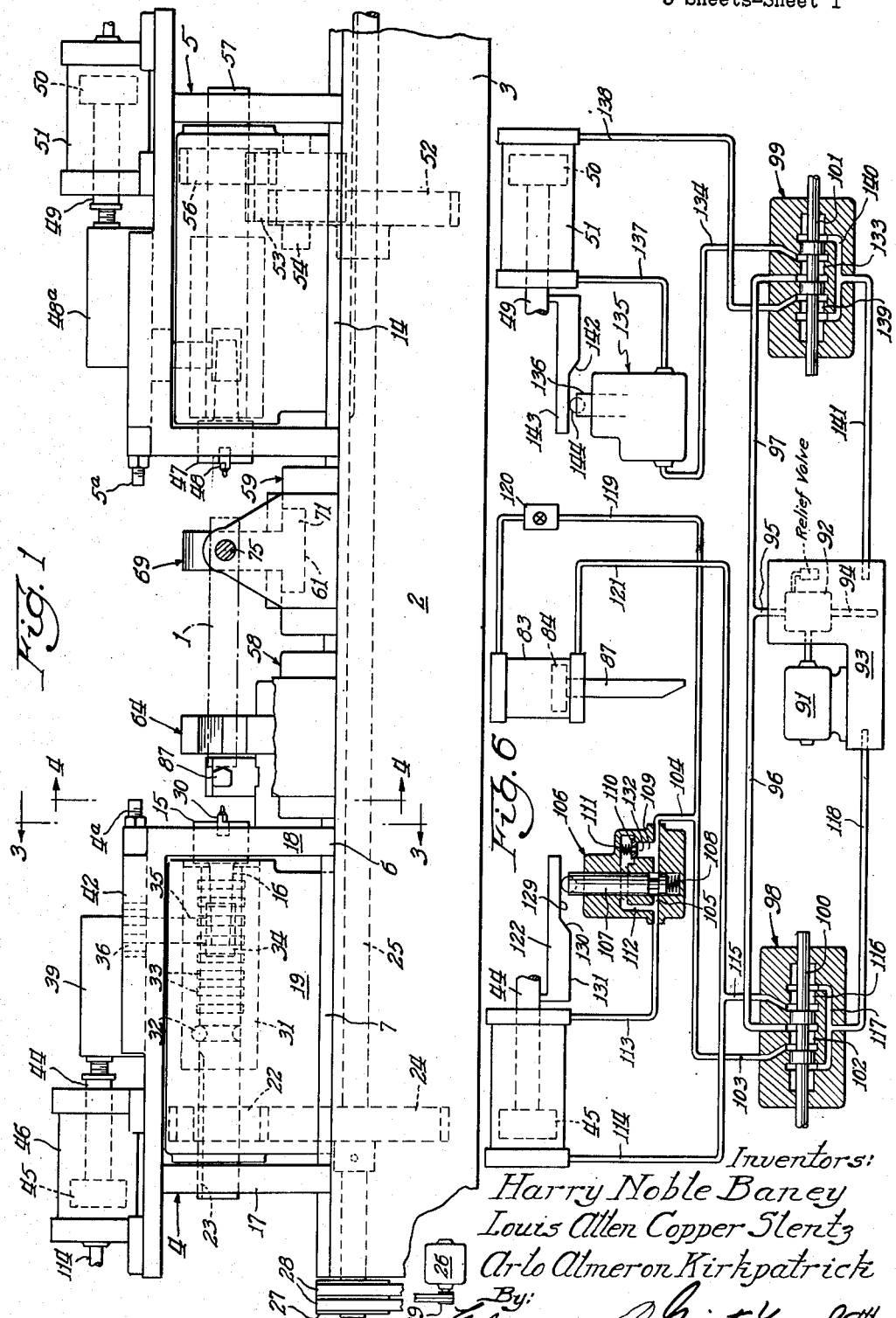
Inventors:
Harry Noble Baney
Louis Allen Copper Slentz
Arlo Almeron Kirkpatrick
By: Edward C. Gritzbaugh Atty.

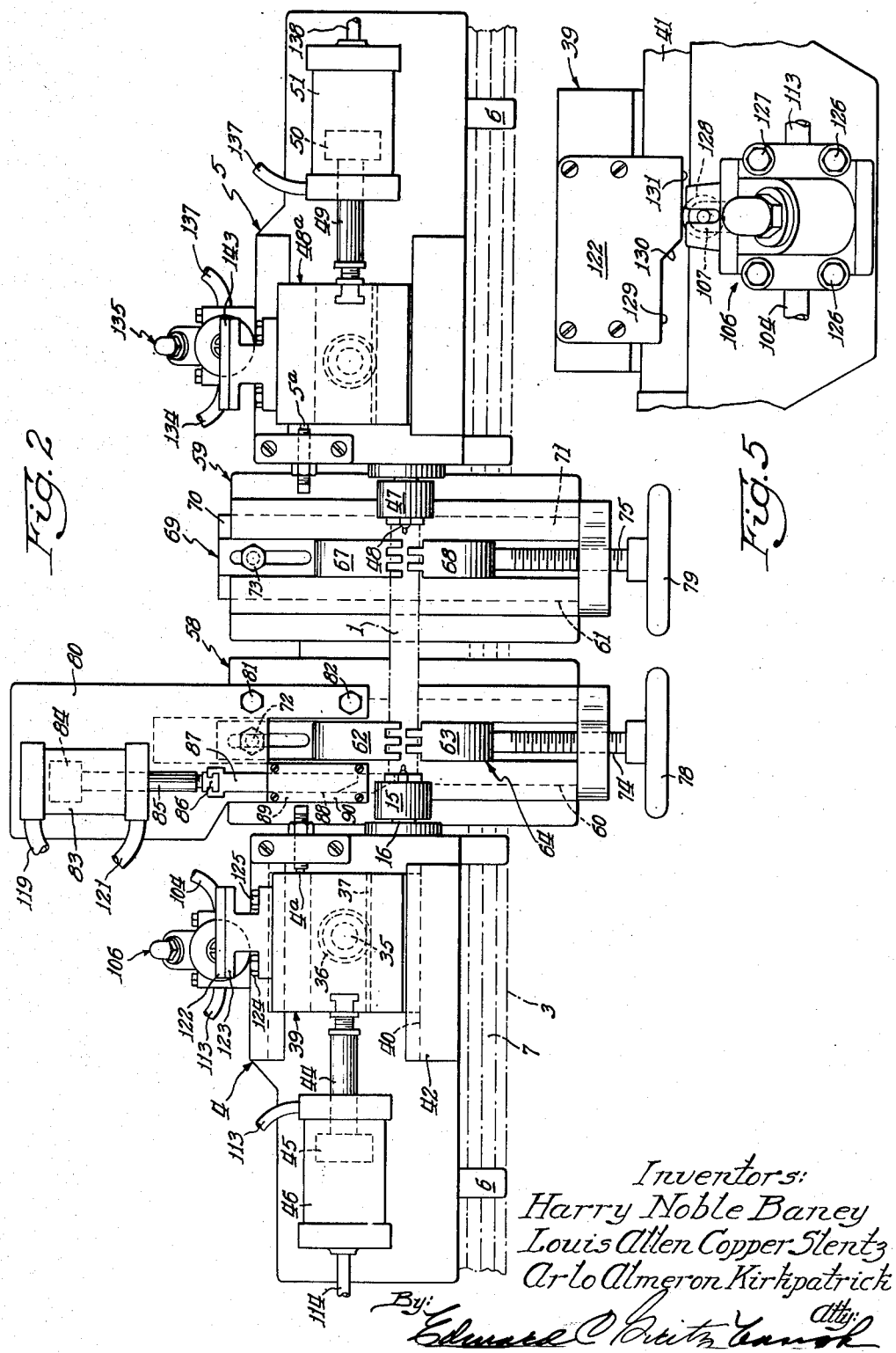

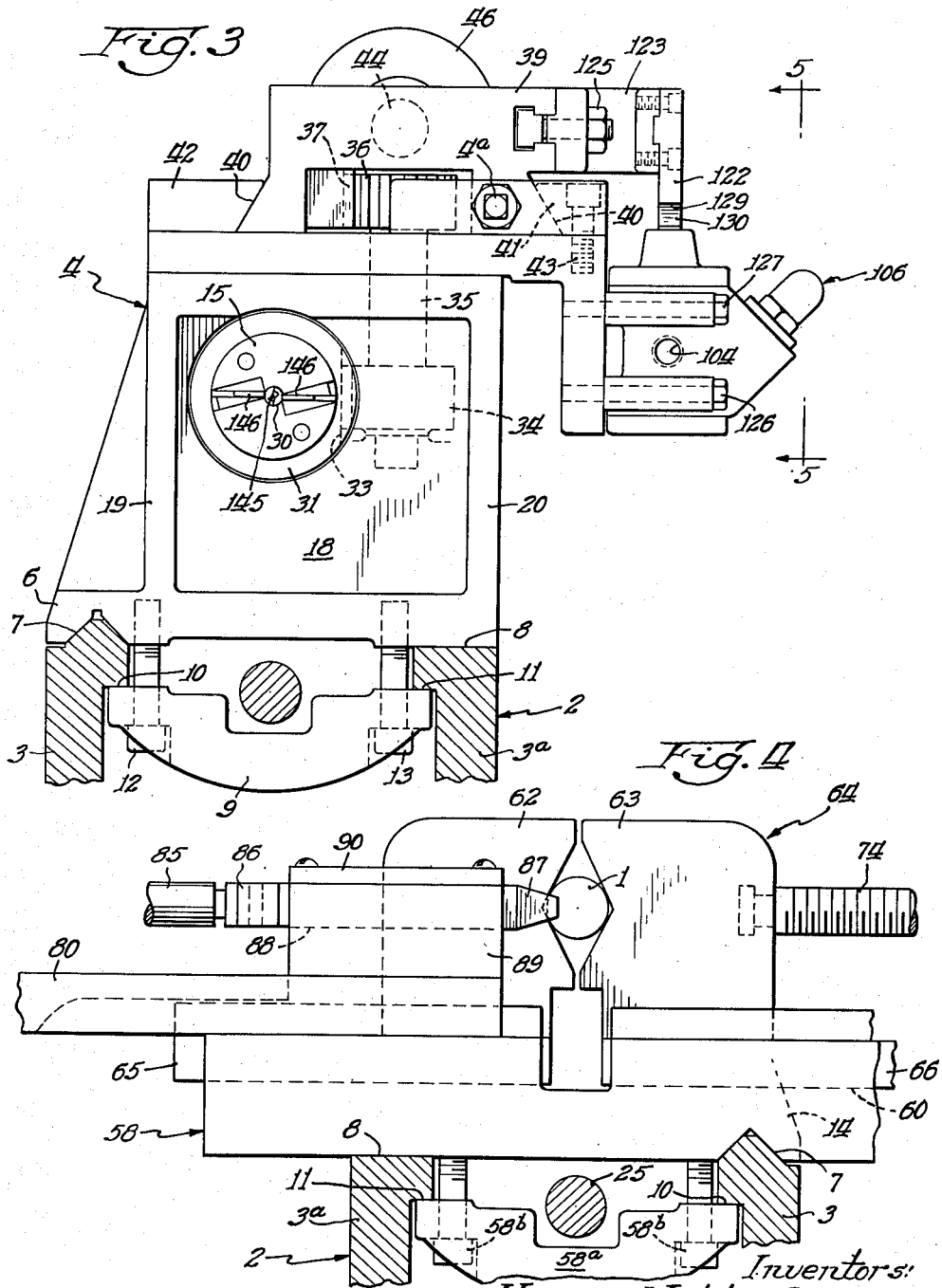

Patented Mar. 31, 1953

2,633,039

UNITED STATES PATENT OFFICE 2,633,039

SHAFT CUTTING AND CENTERING MACHINE

Harry Noble Baney, Louis Allen Copper Slentz, and Arlo Almeron Kirkpatrick, Muncie, Ind., assignors to Borg-Warner Corporation, Chicago, Ill., a corporation of Illinois Application December 26, 1946, Serial No. 718,366

4 Claims. (Cl. 77—21)

The present invention relates to a shaft cutting and centering machine. The general object of the invention is to provide a machine for cutting and centering the ends of shafts.

Heretofore, shaft cutting and centering machines have featured a single handle adapted to be manually actuated to simultaneously advance the cutting and centering tools at opposite ends of the shaft into engagement therewith to cut and center the two ends of the shaft at the same time and to simultaneously retract the tools from the ends of the shaft. Due to the difficulty of accurately cutting the shaft to a predetermined desired length prior to the cutting and centering operation and thereafter locating the shaft with each end exactly the same distance from the adjacent tools, there is, in general, a different amount of cutting to be accomplished on both ends of the shaft. Machines operated in this manner and for this reason are unsatisfactory as one of the tools usually completes its full cutting and centering stroke before the other tool and thereafter rubs on the finished end of the shaft while the other tool is completing the cutting and centering of the other end of the shaft. In such case, the rubbing action of the one tool on the end of a shaft, due to the metal or compound of which the cutting tools are formed, exerts an abrasive action on the finished end of the shaft sufficient to shorten the desired length of the shaft and thereby impairs the utility of the shaft for its intended purpose when the shaft is incorporated in a mechanism, such as an automobile transmission in which axial movement of the shaft is detrimental to the continued satisfactory operation of the transmission.

An object of the present invention is to provide a machine for cutting and centering the ends of shafts independently of each other whereby each end of the shaft may be cut and centered irrespective of the other to provide a shaft of predetermined desired accurate length having its ends suitably centered.

Another object of the invention is to provide a machine for cutting and centering the ends of shafts and incorporating means for independently moving the cutting and centering tools into and out of engagement with the ends of the shaft whereby one tool may be operated to cut and center the associated shaft end and be withdrawn while the other tool continues operating on the other shaft end.

Another object of the invention is to provide a machine for the purpose above described incorporating dual control means for independently actuating the cutting and centering tools.

A further object of the invention is to provide a machine of the type described featuring control means for the power means actuating the cutting and centering tools adapted to effect operation of the power means to move the tools quickly to cutting position and thereafter slowly into cutting engagement with the ends of the shaft.

Another object of the invention is to provide a machine of the type described wherein hydraulic power means is utilized to advance and retract the tools to and from cutting engagement with the ends of the shaft and control means for the power means are provided to advance and retract the tools independently of each other and at the will of the operator.

A different object of the invention is to provide a machine of the type described having power means for locating the shaft in a predetermined position between the cutting tools prior to the cutting operation and means for operating the power means to move the same out of locating position during actuation of the tools to their cutting position.

Other objects, aims and advantages of the improvements that are contemplated herein will be apparent to persons skilled in the art after the construction and operation of the cutting and centering machine is understood from the within description.

It is preferred to accomplish the numerous objects of this invention and to practice the same in substantially the manner hereinafter fully described and as more particularly pointed out in the appended claims. Reference is now made to the accompanying drawings which form a part of this specification wherein:

Fig. 1 is a longitudinal side elevation of a cutting and centering machine showing instrumentalities of the present invention incorporated therein;

Fig. 2 is a top plan view of the machine shown in Fig. 1;

Fig. 3 is a transverse vertical section taken on the plane of line 3—3 of Fig. 1, looking in the direction of the arrows or toward one of the tool heads of the machine;

Fig. 4 is another transverse vertical section, taken on the plane of line 4—4 of Fig. 1, looking in the direction of the arrows or toward the shaft-supporting portion of the machine;

Fig. 5 is a side elevation of the speed-controlling mechanism for the tool head shown in Fig. 3 and taken on the plane indicated by the line 5—5 of Fig. 3; and Fig. 6 is a diagrammatic view, partly in section, of the hydraulic system.

The drawings are to be understood as being more or less of a schematic character for the purpose of disclosing typical or preferred forms of the improvements that are contemplated herein, and in these drawings like reference characters identify the same parts throughout the several views.

As an illustration of one form in which the invention may be embodied, there is shown in the drawings a machine for cutting the ends of a shaft 1 to provide a shaft of a desired predetermined length and also for centering the ends of the shaft to afford a guide for the subsequent assembly of the shaft with other mechanisms.

Such a machine may include an elongated table 2 that is provided with spaced parallel vertical walls 3 and 3a for supporting and guiding the headstocks generally indicated at 4 and 5 to bodily allow reciprocation of the same as desired in directions longitudinally of the table toward and away from the ends of the shaft 1 positioned therebetween in a manner now to be described.

As the construction of the headstocks 4 and 5 is similar, it is believed that a detailed description of only one of them is necessary for the purpose of this disclosure. The headstock 4 comprises a base or saddle 6 that straddles the table and engages the upper surfaces 7 and 8 of the walls 3 and 3a of the table as shown in Fig. 3, the surface 7 being of dovetail design to guide the headstocks in their movement longitudinally of the table. Thus, the headstock may be adjusted longitudinally of the table and thereafter secured against movement, as shown in Fig. 3, by a yoke 9 having engagement with shoulders 10 and 11 of the walls 3 and 3a of the table and, after adjustment of the headstock, maintaining the table and headstock in fixed relation by bolts 12 and 13 entered into openings in the yoke and having threaded engagement with the headstock to clamp the headstock to the table 2. Headstock 5 is mounted in an identical manner on the table 2 and comprises the base or saddle 14 engaging the surfaces 7 and 8 of the table 2 for adjusting movement longitudinally of the table and thereafter to be secured thereto against such movement in the same manner as the headstock 4.

The headstocks 4 and 5 are each equipped with a head or chuck carrying a cutting and centering tool and adapted to be rotatably mounted in the headstock and to be moved toward the adjacent end of the shaft 1. Referring to the conventional mounting of the headstock 4 for rotation, and viewing Figs. 1 and 3, it may be noted that the chuck 15 has its spindle 16 rotatably mounted in the end walls 17 and 18 of the headstock and between the side walls 19 and 20 thereof, the spindle 16 having a gear 22 rotatable therewith by means of its engagement with a spline 23 extending longitudinally of the spindle, said gear meshing with a gear 24 secured to a spindle 25 rotatably mounted in the table 2 and having an operative connection to a motor 26 by means of a pulley 27 and belts 28 having driving connection with a pulley 29 operated by the motor 26 whereby the chuck 15 and its associated cutting and centering tool 30 is rotated. The movement of the chuck 15 and tool 30 longitudinally of the table toward and from the adjacent end of the shaft is effected by means of a sleeve 31 surrounding the spindle 16 and connected thereto for obtaining said movement by means of an annular stud 32 received within a circumferential groove on the spindle and a groove interiorly of the sleeve 31. Thus, movement of the sleeve 31 longitudinally of the table will cause similar movement of the spindle 16 and chuck 15. To effect such movement, the side of the sleeve 31 is formed with teeth 33 to provide a rack engageable with a pinion or gear 34 secured to a vertical shaft 35 journaled in the walls of the headstock and having at its upper end a gear 36 fixed thereto and meshing with teeth 37 interiorly of and on a rack 39 having a lower portion of dovetail design slidable on the top wall of the headstock 4 and presenting exterior end surfaces engageable as at 40 by complementary surfaces of retaining or guide pieces 41 and 42 secured to the upper wall of the headstock by bolts 43 and adapted to guide the rack 39 longitudinally of the table while preventing transverse movement thereof. The rack 39 is secured by means of a threaded coupling to a piston rod 44 having a piston 45 adapted to be moved in opposite directions in a cylinder 46 by pressure-fluid-operated means as hereinafter described. It will be apparent from the foregoing description that, upon movement of the piston 45 to the right, the rack 39 will be thereby actuated in the same direction to rotate the gear 36 and thereby the gear 34 to effect movement of the sleeve 31 by the gear 34 to the right and through the intermediary of the stud 32 to also effect movement of the spindle 16 and chuck 15 to the right, the stud 32 permitting the continued rotation of the spindle 16 and chuck 15 due to the splined connection of the gear 22 to the spindle 21 which permits the gear 22 to remain in constant mesh with the gear 24 driven by the motor, despite the aforesaid movement of the spindle 16, chuck 15 and its associated tool 30 toward the adjacent end of the shaft.

The headstock 5 comprises a chuck 47 and an associated cutting and centering tool 48, which are mounted for rotation and also for movement longitudinally of the table 2 by gear and rack mechanism similar to that associated with the chuck 15, the rack 48a being connected to and actuated by a piston rod 49 and piston 50 in a cylinder 51 mounted on the upper wall of the headstock 5, the piston being actuated by fluid pressure as hereinafter described to reciprocate the chuck and tool to and from the adjacent end of the shaft. However, as it is desirable to interchangeably and indiscriminately use the same tools for both chucks which necessitates driving the chucks 15 and 47 and their associated tools in opposite directions of rotation, the driving gear 52 on the spindle 25 meshes with a gear 53 of a reversing gear set, the gear set also including a shaft 54, the gear 53 also meshing with a gear 56 secured to a spindle 57 for rotating the same and its associated chuck 47 in a direction opposite to that of the direction of rotation of the chuck 15. As seen in Fig. 2, the limits of travel of the respective chucks and their tools are determined by means of adjustable stops 4a and 5a threaded into brackets fixed to the top walls of the headstocks 4 and 5 and adapted to engage the racks 39 and 48a to stop movement thereof and thereby the tools toward each other at the completion of the cutting and centering operation.

Mounted on the table 2 are a pair of slides 58 and 59 each having movement longitudinally of the table and, for this purpose, slidably engaging the upper surfaces 7 and 8 of the walls 3 and 3a of the table 2, as shown in Fig. 4. While the slides 58 and 59 may be moved longitudinally of the table 2, if desired, they are normally maintained in fixed spaced relationship to each other and to the adjacent headstocks 4 and 5 by clamping pieces or yokes associated therewith such as the yoke 58a shown in Fig. 4 which engages the shoulders 10 and 11 of the walls 3 and 3a of the table 2 and secures the slides 58 thereto by the clamping action obtained by bolts 58b.

The slides 58 and 59 are provided with longitudinal ways 60 and 61, each way slidably receiving a pair of gripping jaws of an equalizing vise for permitting movement of the same in a direction transverse to the movement of the headstock to position the axis of the shaft in alignment with the tools 30 and 47 for the cutting and centering operation. As clearly shown in Figs. 2 and 4, the jaw members 62 and 63 of the equalizing vise, generally designated 64, are of inverted T-shaped design in end elevation and are provided with bases 65 and 66 recessed within the way 60 of the slide 58 and the jaw members 67 and 68 of the equalizing vise indicated at 69 are of similar design providing bases 70 and 71 received within the way 61 of the slide 59, said jaw members of said vises being movable to receive therebetween the shaft 1, the jaws 62 and 67 being movable to positions to center the shaft with respect to the tools 30 and 48 for axial alignment therewith, whereupon the jaws 62 and 67 may be secured by means of bolts 72 and 73, received within slots in the jaws, to the slides 58 and 59 whereupon the other jaws 63 and 68 of the respective vises may be brought into engagement with the shaft by the threaded shafts 74 and 75 threaded in end walls of the slides 58 and 59 and rotatable by means of the hand wheels 78 and 79 fixed to the respective shafts for rotating the same. It will be apparent from this description of the vises 58 and 70 that the same are capable of locating the shaft 1 in axial alignment with the cutting and centering tools 30 and 48 for operation of the tools thereon.

In the embodiment of the invention shown in the drawings, means are provided for locating the shaft 1 in a predetermined spaced relationship between the cutting tools 30 and 48 so that the ends of the shaft will be positioned substantially equidistant from the cutting tools. To this end, a plate 80 on the slide 58 is affixed to the top thereof and at one side of the equalizing vise jaw 62, by bolts 81 and 82. The plate has secured thereto a cylinder 83 by any suitable means and having a piston 84 therein actuated by fluid pressure as hereinafter described and connected by a piston rod 85 and coupling 86 to a locating bar 87 which, as shown in Figs. 2 and 4, is adapted to slidably extend through an elongate opening 88 in a guide block 89, having a retaining plate 90 secured thereto, and into the path of the shaft 1 for engagement with the left end of the shaft to thereby locate the ends of the shaft equidistant from the cutting tools 30 and 48, as shown in Figs. 1 and 2.

The chucks 15 and 47 of the headstocks 4 and 5, respectively, are movable into and out of engagement with opposite ends of the shaft 1 by the gear and rack mechanisms previously described which are operated by the pistons 45 and 50 in the cylinders 46 and 51 forming a portion of the hydraulic system now to be described and shown in schematic illustration in Fig. 6. Referring to Fig. 6, it may be noted that a power source such as the motor 91 is utilized to drive a pump 92 which draws fluid from a sump 93 through a pipe 94 and pumps the fluid under pressure into a conduit 95 connected to branch conduits 96 and 97 respectively leading to valves generally indicated 98 and 99 of two-way valve design controlling the pressure fluid to effect movement of the tools into and out of cutting engagement with the ends of the shaft, as well as to move the locating bar 87 to and from the shaft. The valve 98 controls the movements of the piston 45 to advance and retract the cutting tool 30 relative to the adjacent end of the shaft and also controls the movements of the piston 84 to actuate the locating bar 87 toward and from the shaft. The valve 99 is effective to control the movements of the piston 50 to advance and retract the cutting tool 48 relative to the adjacent end of the shaft. The valves 98 and 99 are manually operable independently of each other to effect simultaneous tool-advancing or tool-retracting movements of the pistons 45 and 50 or to effect selective movements of the pistons for retracting one of the tools from cutting engagement with the adjacent end of the shaft while the other tool is advancing in cutting engagement with the other end of the shaft.

In the position of the tool valve bodies 100 and 101 of the valves 98 and 99, respectively, shown in Fig. 6, the valve bodies 100 and 101 have been moved to the right to control the pressure fluid from the conduits 96 and 97 to effect simultaneous actuation of the pistons 45 and 50 in their cylinders 46 and 51, respectively, to retract the tools from cutting engagement with the shaft at the end of the cutting and centering operation shown in Fig. 2 to their initial inactive positions shown in Fig. 1 and also to effect operation of the piston 84 in the cylinder 83 to move the locating bar 87 from its retracted position to its shaft-engaging position. Referring first to the position of the valve body 100 of the valve 98, it will be seen that the flow of pressure fluid from the conduit 96 is directed through the valve passage 102 to the conduit 103, branch conduit 104, through passage 105 of the speed-control valve 106 wherein valve body 107 is raised by a spring 108 to allow flow around a reduced portion of said body 107 to conduit 135, and which valve 106 also comprises a branch passage 109 for the fluid which fluid under pressure is effective to raise the check valve 110 against the pressure of its spring 111 to allow flow of the fluid to passage 112, spaced from the valve body 107, to the passage 105 and thence to the cylinder 46 by the conduit 113, to effect rearward movement of the piston 45 and piston rod 44 therein to withdraw the tool 30 and maintain it in its inactive position. The fluid evacuated from the cylinder 46 by the rearward movement of the piston 45 flows through the conduits 114 and 115 to the valve passages 116 and 117 and to the return conduit 118 leading to the sump 93.

It may be noted that, in the described hydraulic circuit, the conduit 103 has a branch conduit 119 having a manually operable valve 120 in open position to allow the flow of the fluid to the cylinder 83 to move the piston 84 thereby the work-locating bar 87 toward its shaft-engaging position, the fluid expelled from the cylinder 83 by the aforesaid movement of the piston 84 flowing through the conduit 121 to conduit 114 to the conduit 115 which is connected as previously described to the sump 93.

To advance the chuck 15 and its tool 30 to cutting engagement with the adjacent end of the shaft 1, the valve body 100 is moved to the left to direct the flow of the pressure fluid to the rear of the piston 45 to actuate the same, the pressure fluid from the pump and conduit 96 flowing through the passage 116 by reason of the changed position of the valve body and thence to the conduits 115 and 114 to the cylinder 46 to actuate the piston 45 and the piston rod 44 to move the chuck 15 and its tool 30 toward and into cutting engagement with the shaft.

To permit the chuck 15 and its tool 30 to be quickly moved toward the end of the shaft and thereafter to move slowly into cutting engagement with the shaft and also during the cutting operation, a cam plate 122 is suitably secured to the movable rack 39 by means of a mounting member 123 and bolt and nut assemblies 124 and 125, the cam plate 122 being adapted to actuate the speed-control valve 106 to achieve this desirable result in a manner now to be described. Referring to Figs. 3 and 5, it will be noted that the valve 106 is secured to a downwardly extending portion of the headstock 4 by bolts 126 and 127 so that the roller 128 on the valve body 107 of the valve 106 engages the bottom of the cam plate 122 mounted on the movable rack 39. In the position of the various fluid-operated and fluid-control means illustrated in Fig. 6, and prior to the actuation of the valve body 100 of the valve 98 to the right to direct the flow of fluid through the conduit 114 to the piston 45 to actuate the same to engage the tool 30 with the shaft, the valve body 107 of the valve 106 is in its open position to allow free flow of the pressure fluid from the cylinder 46 through the passage 105 of the valve 106 to the sump. Upon movement of the valve body 100 to the right to direct the flow of the pressure fluid to the rear of the piston 45 to advance the tool 30 to shaft-engaging position, the horizontal portion 129 of the cam plate 122 will be ineffective to actuate the valve body 107 to restrict the free flow of the pressure fluid through the passage 105 of the valve 106, and the piston 45 will rapidly advance the tool 30 toward the adjacent end of the shaft. However, as the roller 128 engages the inclined cam portion 130 and horizontal portion 131 of the plate 122, the valve body 127 will be rapidly moved downward against the action of its spring 108 to cut off the flow of the pressure fluid through the passage 105 to the sump and the fluid will thereupon flow through the passage 112 and, as the spring 111 and the fluid pressure has urged the check valve 110 to its closed position, the fluid will be constrained to flow through the small opening 132 in the valve 110 and into the passage 109 of the valve 106 to the conduit 104 and the sump, the practical effect of this phase of operation of the valve 106 being to restrict the free flow of the fluid from the cylinder 46 to check the rapid advance to the piston 45 and thereby to advance the tool 30 slowly into initial cutting engagement with the shaft and during the cutting operation.

The position of the valve body 100 of the valve 98 in its tool-advancing position as above described is also instrumental to effect flow of the pressure fluid to the cylinder 83 through the conduit 115, conduits 114 and 121 to cause the piston 84 in the cylinder 83 to retract the locating bar 87 from engagement with the end of the shaft; the fluid expelled from the cylinder by the movement of the piston flowing through the conduit 119 to the conduit 103 and passage 116 to the sump. The surfaces 129, 130 and 131 of the cam plate 122 are proportioned in such manner with respect to each other that the valve body 128 of the valve 106 will be actuated to close the passage 105 in the valve 106 to retard movement of the piston 45 and thereby the tool before the tool is sufficiently advanced to engage the locating bar 87 so that the latter will be withdrawn completely from the shaft at the time the tool approaches the shaft to begin cutting and centering of the adjacent shaft end.

The hydraulic system for advancing and retracting the chuck 47 and its tool 48 to and from cutting engagement with the adjacent end of the shaft is similar to that described for obtaining similar movements of the chuck 15 and its tool 30 as will be apparent from an inspection of Fig. 6. Considering the hydraulic system for the tool 48, the valve 99, as previously described, is instrumental to control the flow of the pressure fluid from the pump to the piston 50 to reciprocate the same to advance and retract the tool 48. It will be noted that, in Fig. 6, the valve body of the valve 99 has been moved to the right whereby the pressure fluid is operative to maintain the piston 45 in its tool-retracting position, the pressure fluid flowing from the pump through the conduit 97 to the valve passage 133 of the valve 99, conduit 134, and through the speed-control valve 135, identical with valve 106 and thereby allowing free flow of the fluid inasmuch as its valve body 136 is in its raised position to the conduit 137 to the cylinder 51 to the piston 50, the fluid expelled by the piston flowing from the cylinder 51 through the conduit 138 to the passages 139 and 140 in the valve 99 to the conduit 141 connected to the sump.

Upon movement of the valve body 101 of the valve 99 to the left to direct the pressure fluid to actuate the piston 50 to move the chuck 47 and tool 48 toward and into cutting engagement with the adjacent end of the shaft, the pressure fluid will be directed from the conduit 97 to the passage 139 of the valve 99 to the conduit 138 and the cylinder 51 to exert pressure on piston 50 and move the same forward to advance the tool 48 to its shaft-cutting and centering position. Due to the pressure of the fluid entering the cylinder 51 from the conduit 138, the piston 50 will expel the fluid at the left thereof in the cylinder to the conduit 137 and valve 135, which valve permits the free flow of the fluid to allow the rapid movement of the piston 50 and thereby the tool 48 toward the adjacent end of the shaft until the cam portion 142 of the cam plate 143, mounted on the rack 48a and similar to that of the cam plate 122 on the rack 39, engages the roller 144 of the valve body 136. At this time, the valve body 136 will be urged downwardly by the cam plate to reduce the flow of fluid through the valve 135 to substantially decrease the speed of travel of the piston 50 and thereby the tool 48 into cutting engagement and during such engagement with the adjacent end of the shaft. Upon the passage of the fluid through the valve 135, the fluid will flow through the conduit 134, the passages 133 and 140 of the valve 99, to the conduit 141 and the sump 93. It will be seen from the foregoing that the instrumentalities and operation of the hydraulic system for the advancement and retraction of the cutting and centering tool 48 is identical to that of the hydraulic system for the operation of the tool 30.

The cutting and centering tool 30 shown in Fig. 3 is identical with the tool 48 and comprises the centering bit 145 engageable with the end of the shaft along its axis to center the same and also comprises the cutting blades 146, 146 adapted to cut the end of the shaft to obtain a shaft of a predetermined desired length.

In the event, a shaft is of the predetermined desired length and within acceptable tolerances required so that it is not necessary to cut the ends of the shaft by the machine, the cutting blades of each tool 30 and 48 may be removed and the machine can then be utilized to merely center the shaft. In such case, the necessity for utilizing the shaft-locating bar is dispensed with and it may be retained in its retracted position by disconnecting the cylinder 83 from the conduit 119 by operating the valve 120 to prevent the flow of pressure fluid to the cylinder 83 and actuation of the piston 84 to advance the locating bar 87 to its shaft-engaging position.

It will be apparent from the foregoing description that inasmuch as the valve bodies 100 and 101 of the valves 98 and 99, respectively, controlling the operation of the tools 30 and 48, are independently operable that both of the tools may be simultaneously moved to shaft-cutting and centering position and also retracted from such position and also that the tools may be selectively operated independently of the other. By controlling the movement of the tools independently of each other, each end of a shaft may be processed without reference to the other so that the shaft will be cut to a predetermined desired length with considerable accuracy and also the ends of the shaft will be centered satisfactorily. An important advantage is obtained by the hydraulic speed-control valves effecting the rapid advance of the tools toward their cutting and centering position adjacent the ends of the shaft and thereafter slowly moving the tools into and during their cutting and centering engagement with the shaft, these operations considerably expediting the cutting and centering of the shaft ends while insuring satisfactory performance of the tools and prolonging their useful life. It will be apparent that the shaft-locating function of the machine is of considerable value in accurately positioning the shaft between the tools substantially equidistant therefrom whereby the ends of the shaft will be operated on by the tools for an equal proportionate amount of time thus permitting the processing of a substantial amount of shafts within a short period.

While the embodiment of the invention herein disclosed constitutes a preferred form, it is to be understood that other forms might be adopted, all coming within the scope of the claims which follow.

We claim:

1. In a machine for cutting the ends of shafts of different lengths to provide shafts of uniform length, shaft support for fixedly holding a shaft in cutting position, cutting heads including rotary cutting tools positioned adjacent said support and each being movable along an axis aligned with the axis of said shaft from a retracted position toward said support to an advanced position wherein said tools engage respective ends of a shaft mounted on the support, a locating member movable from an advanced position, wherein it is in the path of movement of said cutting tools and wherein it determines the cutting position of a shaft placed on said support by forming an abutment against which an end of the shaft is adapted to be placed, to a retracted position, an hydraulic motor operatively connected to said locating member for moving the same, hydraulic motors operatively connected to said cutting heads for moving the latter, a pump providing a source of motive fluid for said motors, a control valve connected to said pump and one of the motors for moving one of the cutting heads, a control valve connected to said pump and the motor connected to the locating member and the other motor connected to the other cutting head and operable in one position thereof to direct the fluid to actuate the motor, which controls the movements of said locating member, to maintain the latter in its advanced position and to actuate the other motor, which controls the movements of said other cutting head, to maintain the latter in its retracted position, said valve being operable when moved to another position thereof to direct the fluid to actuate said first-mentioned motor to retract said locating member and thereafter to direct the fluid to actuate said other motor to move the other cutting head to its advanced position, said first-mentioned control valve being operable independently of said second-mentioned control valve to direct fluid to actuate said one cutting head to its advance position, and means for continuously rotating said cutting tools.

2. In a machine for cutting the ends of shafts, a shaft support, a cutting head including a rotary cutting tool positioned adjacent said support and movable from a retracted position toward said support to an advanced position wherein said tool engages one end of a shaft mounted on the support, a locating member movable from an advanced position, wherein it is in the path of movement of said cutting tool and wherein it determines the cutting position of a shaft placed on said support by forming an abutment against which an end of the shaft is adapted to be placed, to a retracted position, an hydraulic motor operatively connected to said locating member for moving the same, an hydraulic motor operatively connected to said cutting head for moving the latter, a pump providing a source of motive fluid for said motors, a control valve connected to said pump and motors and operable in one position thereof to direct the fluid from the pump to actuate the motor which controls the movements of said locating member to maintain the latter in its advanced position and to actuate the motor which controls the movements of said cutting head to maintain the latter in its retracted position, said valve being operable when moved to another position thereof to direct the fluid from the pump to actuate said first-mentioned motor to retract said locating member and thereafter to actuate said second-mentioned motor to move the cutting head to its advanced or shaft-engaging position, a speed control valve operatively connected to said control valve and to the motor, which controls the movements of said cutting head, and operable in one position thereof to permit free flow of motive fluid to said latter motor and effect full speed operation thereof, said speed control valve being operable in another position thereof to restrict the flow of motive fluid to said latter motor and effect a slower speed thereof, means operable upon actuation of said latter motor for controlling the movements of said speed control valve, and means for continuously rotating said cutting tool.

3. In a machine for cutting the ends of shafts, a shaft support, a cutting head including a rotary cutting tool positioned adjacent said support and movable from a retracted position toward said support to an advanced position wherein said tool engages one end of a shaft mounted on the support, a locating member movable from an advanced position, wherein it is in the path of movement of said cutting tool and wherein it determines the cutting position of a shaft placed on said support by forming an abutment against which an end of the shaft is adapted to be placed, to a retracted position, an hydraulic motor including a cylinder and piston therein, means operatively connecting said piston to said locating means for moving the latter, a second hydraulic motor including a cylinder and a piston, means operatively connecting said latter piston to said cutting head for moving the latter, a source of motive fluid for said motors, means providing a pair of inlet and outlet ports for each cylinder on opposite sides of its respective piston, a control valve connected to said source and to said inlet and outlet ports and operable in one position thereof to admit motive fluid to said first-mentioned cylinder to move its piston in a direction to advance said locating member and simultaneously to admit motive fluid to said second-mentioned cylinder to move its piston in a direction to retract the cutting head, said valve being operable when moved to another position thereof to admit motive fluid to said first-mentioned cylinder to move its piston in a direction to retract said locating member and thereafter to admit motive fluid to said second-mentioned cylinder to move its piston in a direction to move the cutting head to its advanced or shaft-engaging position, a speed control valve assembly operatively connected to said control valve and to one of said ports in said second-mentioned cylinder and having a valve operable in one position thereof to restrict the flow of motive fluid through the assembly and thereby from said cylinder to effect slow travel of the cutting head toward and during engagement with the shaft and in another position thereof to permit free flow of motive fluid through the valve assembly and thereby the cylinder to effect rapid travel of the cutter head from the shaft after cutting of the shaft by the cutting tool, means operable under the control of movement of the piston, associated with said second-mentioned cylinder, for controlling the movements of said speed control valve, and means for continuously rotating said cutting tool.

4. In a machine for cutting the ends of shafts of different lengths to provide shafts of uniform length, a stationary shaft support; fluid pressure actuated cutter-carrying slides positioned at opposite ends of said shaft support and independently movable along an axis, aligned with the axis of said shaft carried by said support, to engage the ends of the shaft carried by said support; a fluid pressure actuated locating stop movable transversely of the axis of the shaft to engage and position one end of the shaft a predetermined distance from one of the slides; a source of supply of hydraulic fluid under pressure for operating said slides and locating stop; a first valve for controlling the flow of fluid under pressure from said source of supply to said fluid pressure operated locating stop and to one of said fluid pressure operated slides; and a second valve for controlling the flow of fluid under pressure from said source of supply to the other of said fluid pressure operated slides.

HARRY NOBLE BANEY.
LOUIS ALLEN COPPER SLENTZ.
ARLO ALMERON KIRKPATRICK.

REFERENCES CITED

The following references are of record in the file of this patent:

UNITED STATES PATENTS

| Number | Name | Date |
|---|---|---|
| 680,724 | Mussetter et al. | Aug. 20, 1901 |
| 1,787,781 | Galloway | Jan. 6, 1931 |
| 1,813,040 | Ferris | July 7, 1931 |
| 1,905,133 | Bishop et al. | Apr. 25, 1933 |
| 1,954,920 | Damerell | Apr. 17, 1934 |
| 1,972,595 | Libby | Sept. 4, 1934 |
| 2,545,344 | Crawford et al. | Mar. 13, 1951 |